Figure 20:
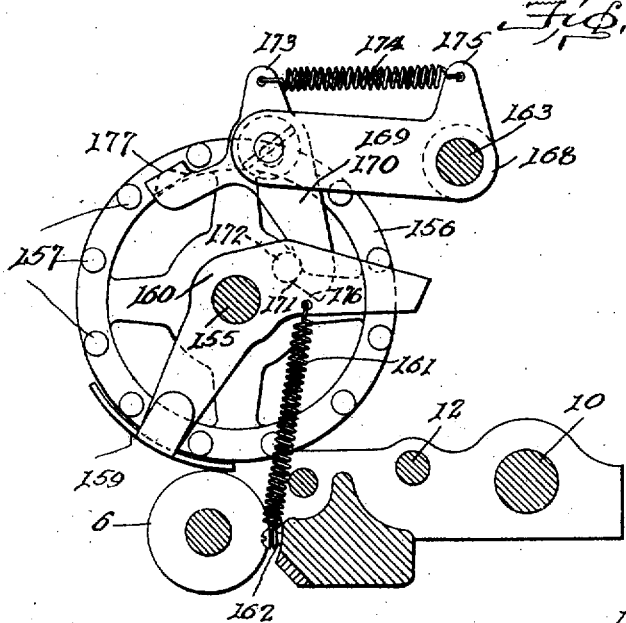

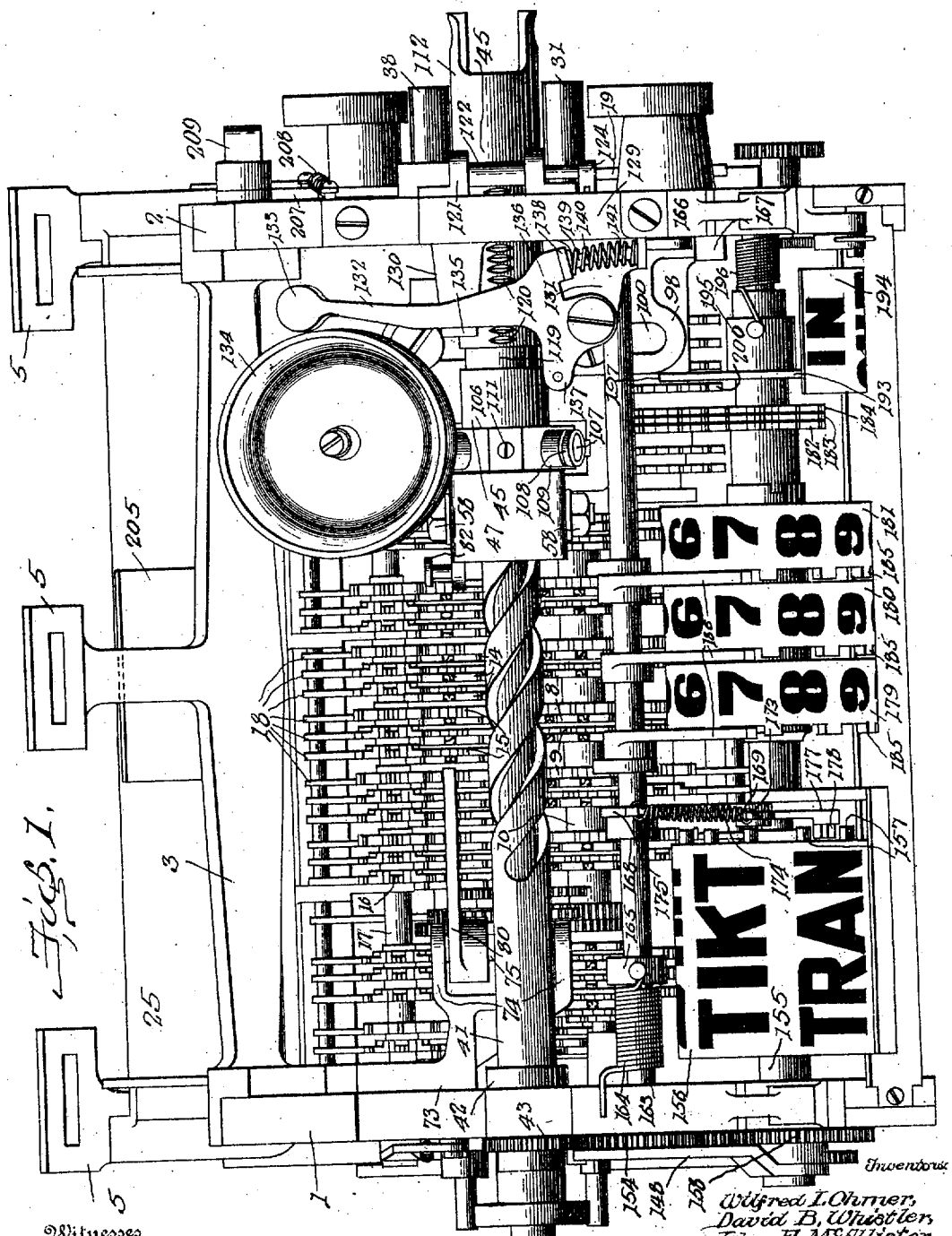

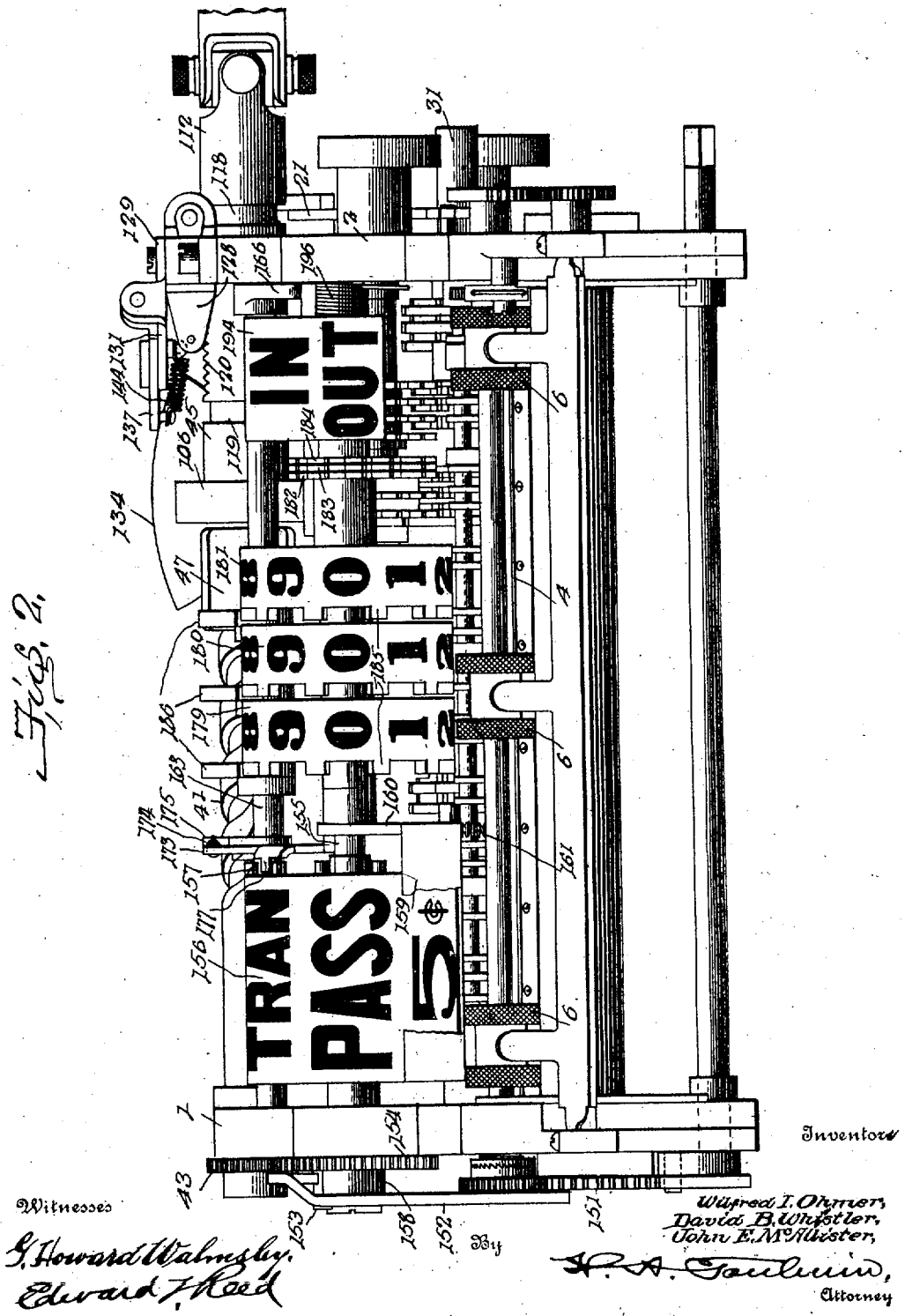

No. 848,262. PATENTED MAR. 26, 1907.
W. I. OHMER, D. B. WHISTLER & J. E. McALLISTER.
FARE REGISTER.
APPLICATION FILED NOV. 20, 1906.
9 SHEETS—SHEET 3.
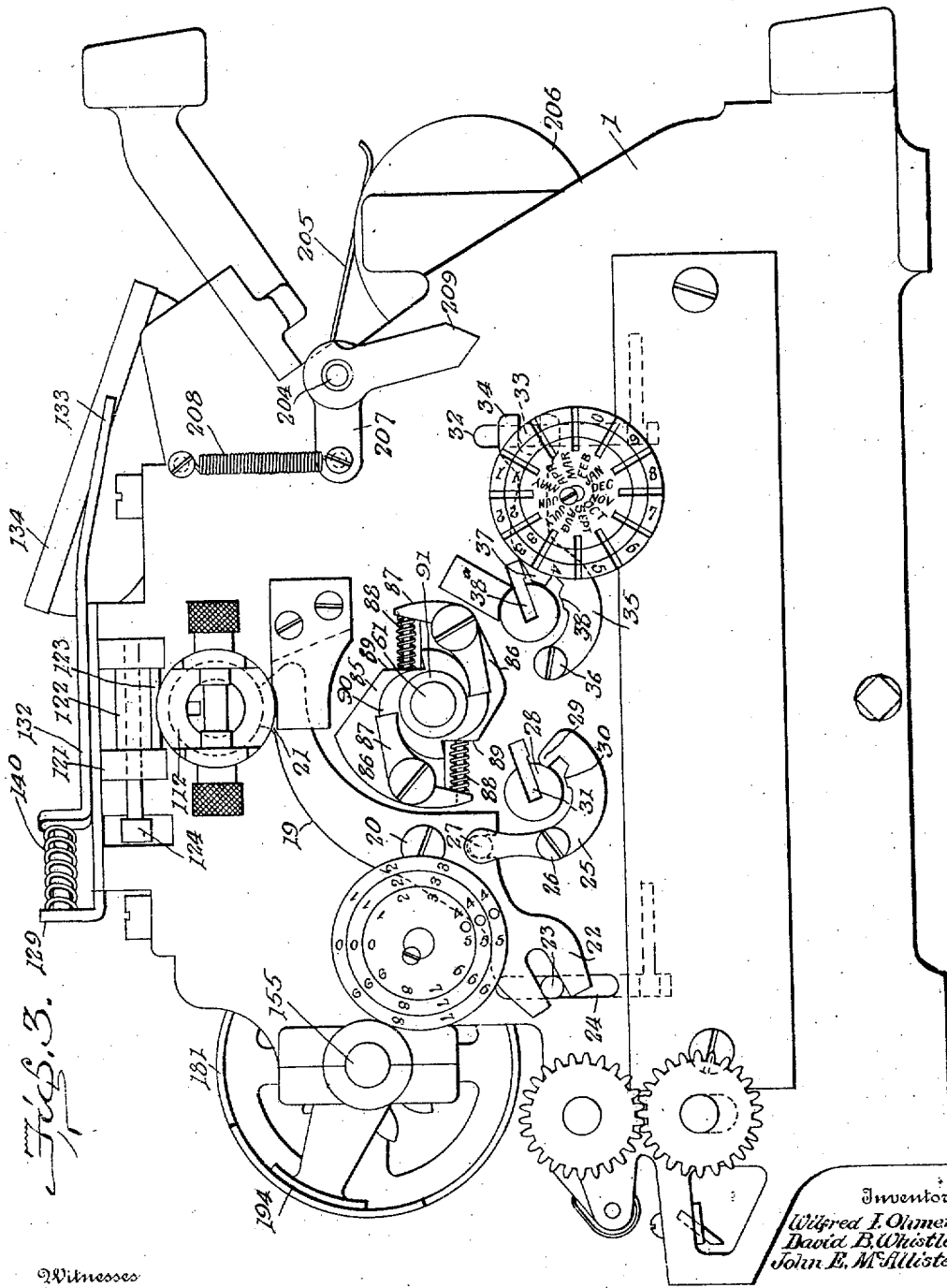
Witnesses
G. Howard Walmsley
Edward F. Reed
Inventors
Wilfred I. Ohmer,
David B. Whistler,
John E. McAllister;
By H. A. Goeleum
Attorney
THE NORRIS PETERS CO., WASHINGTON, D. C.

No. 848,262. PATENTED MAR. 26, 1907.
W. I. OHMER, D. B. WHISTLER & J. E. McALLISTER.
FARE REGISTER.
APPLICATION FILED NOV. 20, 1906.
9 SHEETS—SHEET 4.
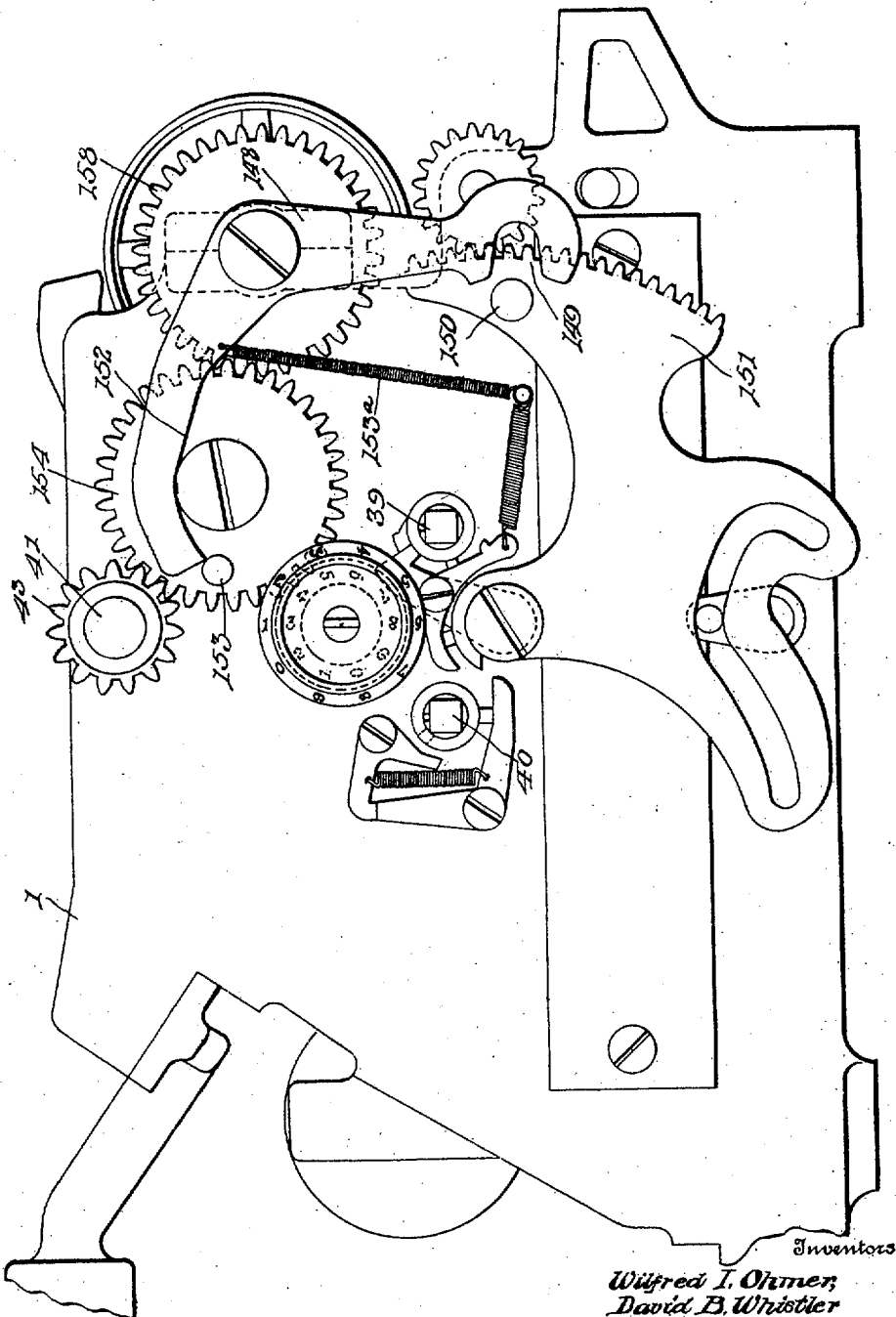
Witnesses
G. Howard Walmsley.
Edward F. Reed
Inventors
Wilfred I. Ohmer,
David B. Whistler
John E. McAllister,
By _____ Attorney No. 848,262. PATENTED MAR. 26, 1907.
W. I. OHMER, D. B. WHISTLER & J. E. McALLISTER.
FARE REGISTER.
APPLICATION FILED NOV. 20, 1906.
9 SHEETS—SHEET 5.
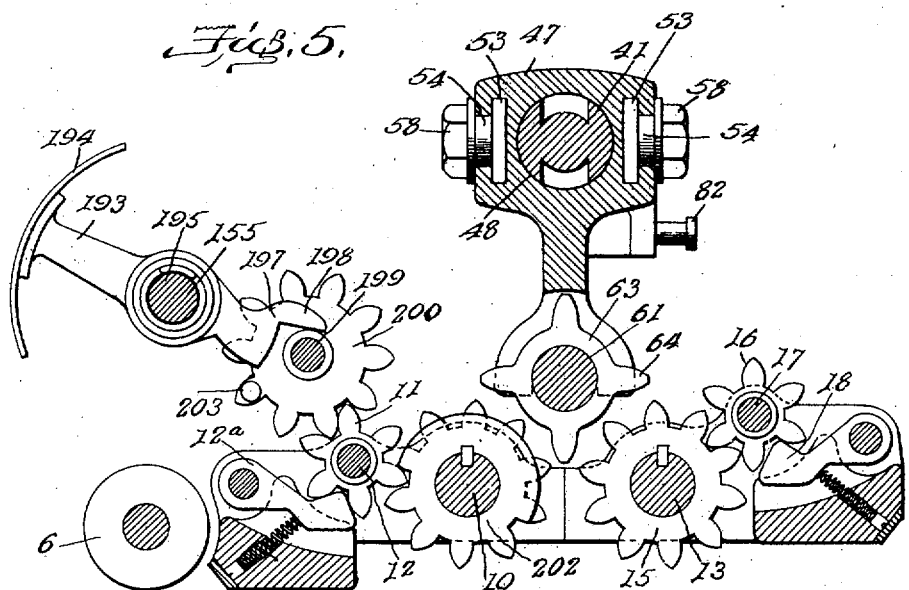
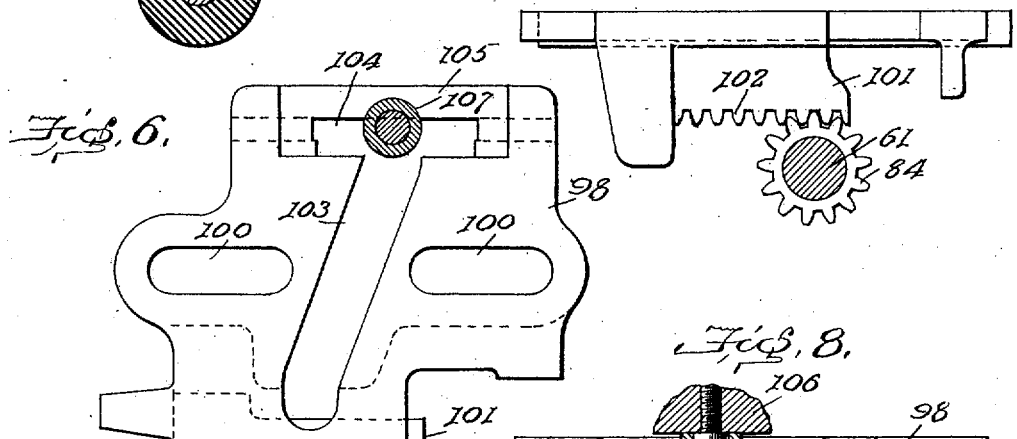
Witnesses
G. Howard Walmsley
Edward L. Reed
Inventors
Wilfred I. Ohmer,
David B. Whistler,
John E. McAllister,
By H. A. Toulmin
Attorney

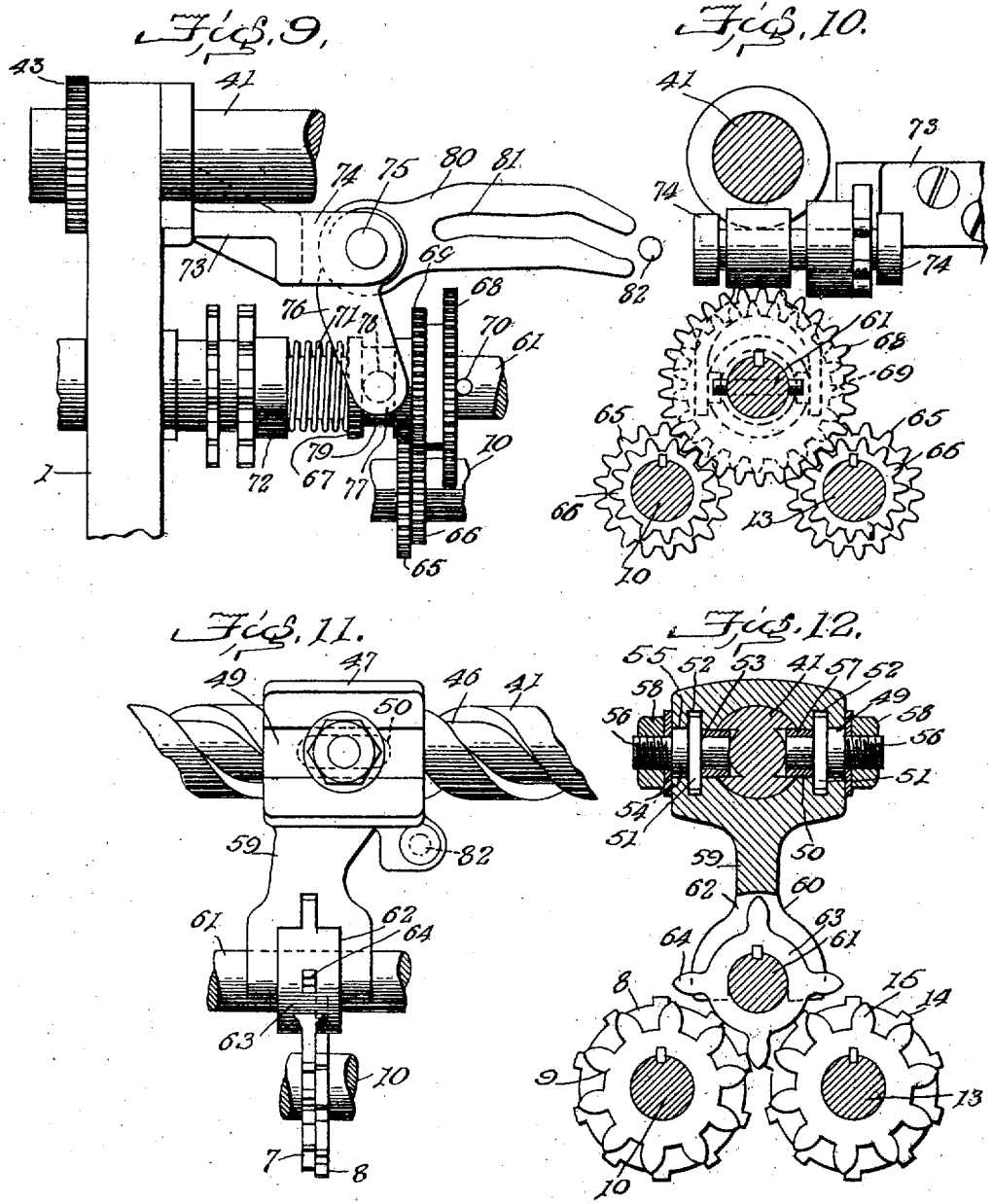

No. 848,262. PATENTED MAR. 26, 1907.
W. I. OHMER, D. B. WHISTLER & J. E. McALLISTER.
FARE REGISTER.
APPLICATION FILED NOV. 20, 1906.
9 SHEETS—SHEET 7.
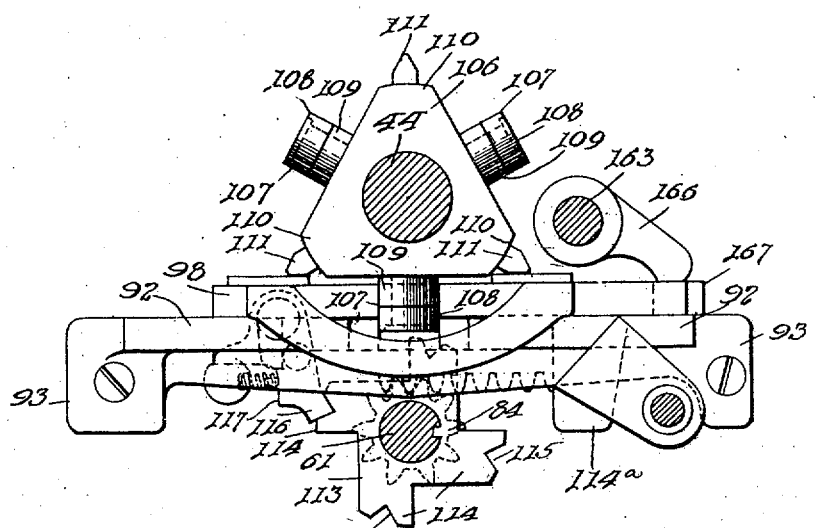
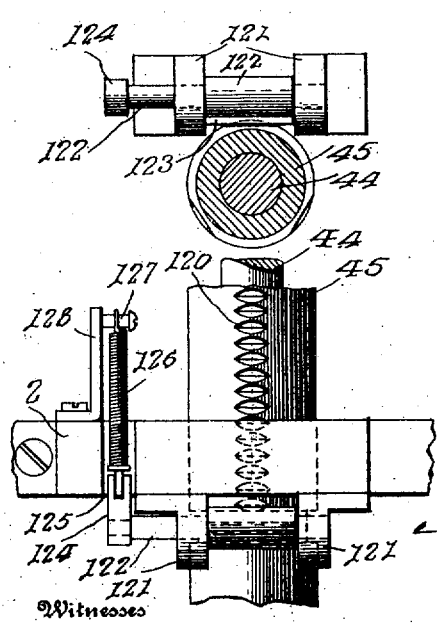
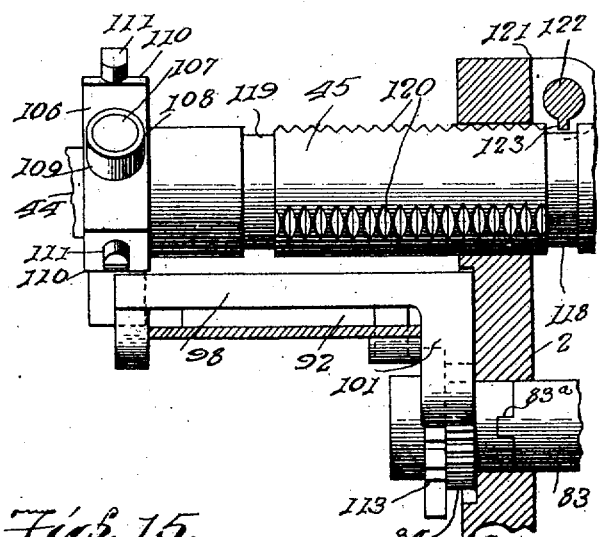
Witnesses
G. Howard Walmsley
Edward F. Reed
Inventors
Wilfred I. Ohmer,
David B. Whistler,
John E. McAllister,
By
Attorney No. 848,262. PATENTED MAR. 26, 1907.
W. I. OHMER, D. B. WHISTLER & J. E. McALLISTER.
FARE REGISTER.
APPLICATION FILED NOV. 20, 1906.
9 SHEETS—SHEET 8.
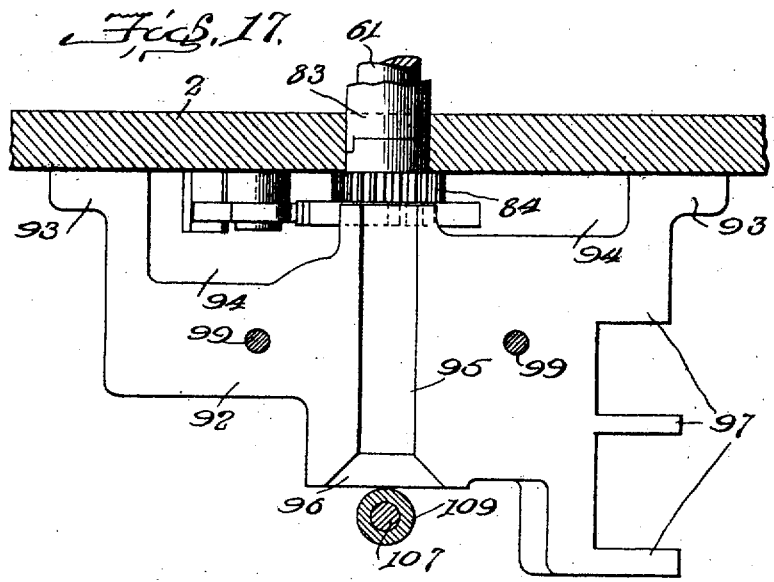
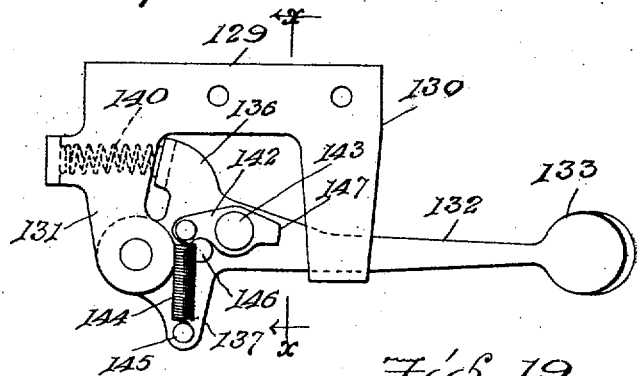
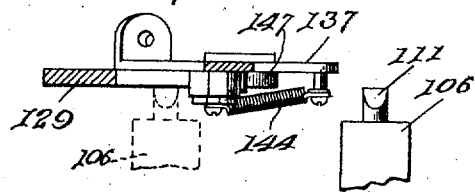

No. 848,262. PATENTED MAR. 26, 1907.
W. I. OHMER, D. B. WHISTLER & J. E. McALLISTER.
FARE REGISTER.
APPLICATION FILED NOV. 20, 1906.

9 SHEETS—SHEET 9.

Witnesses
G. Howard Walmsley.
Edward L. Reed.

Inventors
Wilfred I. Ohmer,
David B. Whistler,
John E. McAllister,
By H. A. Toulmin,
Attorney

UNITED STATES PATENT OFFICE.

WILFRED I. OHMER, DAVID B. WHISTLER, AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

FARE-REGISTER.

No. 848,262.     Specification of Letters Patent.     Patented March 26, 1907.

Application filed November 20, 1906. Serial No. 344,258.

*To all whom it may concern:*

Be it known that we, WILFRED I. OHMER, DAVID B. WHISTLER, and JOHN E. McALLISTER, citizens of the United States, residing at Dayton, in the county of Montgomery and State of Ohio, have invented certain new and useful Improvements in Fare-Registers, of which the following is a specification, reference being had therein to the accompanying drawings.

The present invention relates to fare-registers of the type adapted to register a variety of fares, to record each class of fares separately, and to preserve a separate record of the total number of fares of each class and the total amount of cash received on each trip, a separate record of the total number of fares of each class and the total amount of cash received during a day, and a separate record of the grand total number of fares of all kinds received, and adapted to print such records at the end of each trip and each day, respectively, such a machine being shown and described in the application filed by Wilfred I. Ohmer, Albert J. Kirchner, and John W. Hill December 16, 1905, Serial No. 292,068, and in the patent granted to Wilfred I. Ohmer, John W. Hill, David B. Whistler, and J. E. McAllister December 25, 1906, No. 839,630.

The present invention is in the nature of an improvement upon the machines set forth in the said applications, and has for its object the production of an improved machine of this class embodying a minimum number of parts and adapted to have both the setting and registering and recording mechanisms actuated by a single operating-shaft, and, further, to provide certain safeguards which will insure accuracy in the operation of the machine and to improve the details of construction, thereby facilitating the operation of the machine.

With these objects in view we have employed in the present machine a part of the mechanism disclosed in the above-mentioned applications, together with certain novel features of construction to be hereinafter described and then more fully pointed out in the claims.

Figure 21:
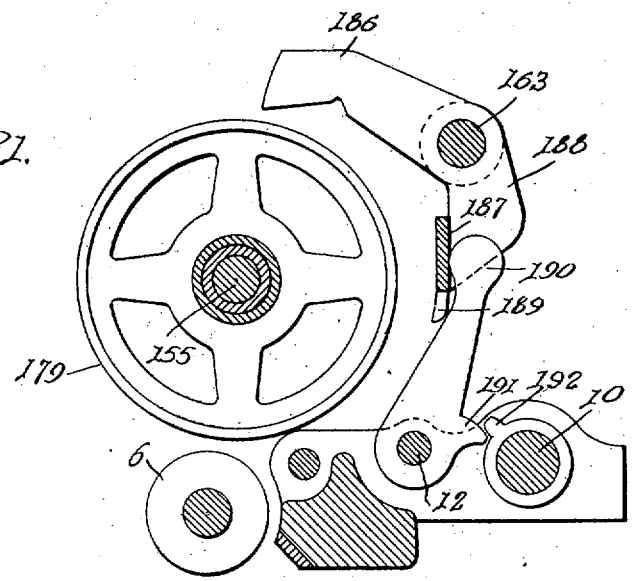

In the accompanying drawings, Figure 1 is a top plan view of the machine as a whole. Fig. 2 is a front elevation of the same. Fig. 3 is an elevation of one end thereof. Fig. 4 is a similar view of the opposite end thereof. Fig. 5 is a transverse section taken through the operating-shaft, counter-shafts, and their auxiliary shafts. Fig. 6 is a top plan view of one of the sliding plates of the operating mechanism. Fig. 7 is a rear elevation of the same. Fig. 8 is a front elevation thereof. Fig. 9 is a detail view of the operating mechanism for the total-cash counters. Fig. 10 is an end elevation of the same. Fig. 11 is a detail in elevation of the actuating mechanism. Fig. 12 is a transverse sectional view of the same. Fig. 13 is an end view of the actuating-plates and their coöperating mechanism in their assembled position. Fig. 14 is a side elevation of the same, partly in section. Fig. 15 is a top plan view of the locking device for the operating mechanism. Fig. 16 is a transverse sectional view of the same. Fig. 17 is a top plan view of the lower plate of the operating mechanism. Fig. 18 is a bottom plan view of the bell-ringing device. Fig. 19 is a transverse section of the same on the line $x\,x$ of Fig. 18 and looking in the direction of the arrows. Fig. 20 is an end view of the fare-indicator with its shield and the coöperating mechanism, and Fig. 21 is a similar view of the device for preventing the overthrow of the passenger-indicator.

In the drawings we have shown and will now proceed to describe only so much of the mechanism of the machines included in the above-mentioned applications as is necessary to an understanding of the present invention. The frame of the machine is similar to that included in the said applications and comprises the end frame members 1 and 2, connected by transverse bars 3 and 4, and is provided at the rear with a plurality of slotted lugs 5 for attaching the register to a suitable stationary support. The entire register and frame are inclosed in a casing, which is not shown in the drawings, as it forms no part of the invention. The printing mechanism is located in the lower part of the frame; but as it forms no part of this invention the only part thereof shown in the drawings are the paper-feeding rolls 6 and 7. (Shown in Figs. 2 and 5.) The recording mechanism is located immediately above the printing mechanism and comprises the trip-counters 8 and their operating-gears 9, rotatably mounted on the resetting-shaft 10, which is journaled in the opposite end members 1 and 2 of the frame and has extending parallel therewith the transferring-gears 11, rotatably mounted on the shaft 12 and provided with a suitable detent 12ª. Extending parallel to the shaft 10 and in the same horizontal plane is a second resetting-shaft 13, carrying the daily-total counters 14 and their operating-gears 15. This shaft is also provided with transfer-gears 16, loosely mounted on the shaft 17, extending parallel with the shaft 13 and provided with a suitable detent 18.

Both the recording mechanism and the printing mechanism are normally locked against operation and can only be released by the operator inserting his key in the keyway and registering his number in the machine. Such a locking mechanism for the trip recording and printing mechanism is shown in Fig. 3 and comprises a lever 19, pivoted at 20 to the end frame of the machine and having its upper end provided with a locking-plate 21, adapted to engage the operating mechanism of the counters, as hereinafter described, and having its lower end 22 bifurcated and engaging a pin 23 on a sliding bolt 24, adapted normally to lie in the path of the printing mechanism and prevent the forward movement of the same. A second lever 25 is pivotally connected to the end frame at 26 and has one end in engagement with the lever 19 at 27, the opposite end extending around the key-shaft 28 and having a lug or projection 29 and a cam 30 intermediate said projection and its pivotal center. The key-shaft 28 is provided with a keyway 31, and in order to release the recording and printing mechanism the conductor must insert his key in the keyway 31, rotating the same until it comes in contact with the projection 29, moving the lever 25 about its pivot, and thereby rocking the lever 19 on its pivot 20 and releasing the locking-plate 21 from the operating mechanism and raising the sliding bolt 24 out of the path of the printing mechanism. The parts retain this position until the conductor turns his key to remove the same from the keyway, when the key comes in contact with the cam 30, moving the lever 25 in the reverse direction and returning the parts to their locked position. A similar locking mechanism is provided for the printing mechanism for the daily record, comprising a sliding bolt 32, having a pin 33 engaged by the bifurcated end 34 of a lever 35, pivoted at 36 to the end of the frame and provided with a projection 37 and a cam 38 between said projection and its pivotal center.

The operation of the lever is similar to that of the trip-counters and the printing mechanism therefor and consists in the cashier inserting his key in the keyway 38ª and revolving the same until it comes in contact with the projection 37, moving the sliding bolt 32 out of the path of the printing mechanism, allowing the same to be turned to the rear to print the daily totals from the recording mechanism. When the cashier removes his key, it engages with the cam 38 and returns the parts to normal position. The resetting-shafts extend beyond the end of the frame opposite the end supporting the locking mechanism and are provided with squared ends 39 and 40, adapted to receive the operating-wrench. These resetting-shafts are provided with locking mechanism, whereby they are locked against movement until the printing mechanism for the respective counters has been operated. Any suitable locking mechanism may be employed for this purpose. One form of such mechanism is shown in Fig. 4 of the accompanying drawings and is fully described and claimed in the above-mentioned patent.

The mechanism thus far described is shown and described in detail in the above-mentioned applications.

A screw-shaft 41 is mounted in the end members 1 and 2 of the frame, near the upper end thereof, and extends parallel with the resetting-shafts 10 and 13 and is located in a vertical plane extending midway between these shafts. The shaft 41 is journaled in a bearing 42 at one end of the machine and projects beyond the same, where it is provided with a pinion 43. The opposite end of the screw-shaft 41 is reduced, as shown at 44, to receive the actuating-sleeve 45, which in turn is journaled in the end frame member 2 and has both a reciprocatory and a rotatory movement therein. This sleeve is mounted to slide on the reduced end 44 of the screw-shaft 41, but is so connected therewith as to cause said shaft to rotate in unison with said sleeve. The screw-shaft 41 is provided with a double quick-pitch thread or spiral groove 46 and has mounted thereon a nut 47, provided with suitable lugs adapted to engage said spiral groove. This nut may be of any suitable construction; but we prefer that shown in the drawings, in which the nut consists of a substantially rectangular block having a longitudinal bearing-aperture 48, adapted to receive the screw-shaft and provided on its opposite sides with T-shaped slots 49, which are provided with longitudinally-extending slots 50 through the inner walls thereof. A guide-plate 51, having both ends rounded, as shown at 52, is mounted in each slot 49 and is provided with a central aperture 53, registering with the slot 50 in the rear wall of the T-shaped slot 49. The guide-plate 51 is further provided with a boss 54, surrounding said aperture and fitting within the reduced portion 55 of the T-shaped slot and serving as a guide for said guide-plate. A bolt 56 extends through the aperture 53 and the slot 50 and is provided on its inner end with a rotatable bearing-sleeve 57, engaging with the spiral groove 46 in the screw-shaft. The outer end of the bolt 56 is screw-threaded and provided with a suitable nut 58, thereby enabling the bolts to be adjusted relatively one to the other and to take up wear. The nut 47 is provided with a downwardly-extending arm 59, having its lower end bifurcated to form a yoke 60, extending on opposite sides of the actuating-shaft 61 and having its central portion cut away, as shown at 62, to receive the actuating-gear 63, which rotates freely therein and moves longitudinally therewith. The actuating-gear 63 is mounted to slide longitudinally of the shaft 61, but rotates in unison therewith. This gear is provided with one or more gear-teeth 64, adapted to mesh with the gears 9 and 15 on the respective counters, mounted on the resetting-shafts 10 and 13, to advance the same the space of one unit for each movement of the tooth 64. In the present instance this actuating-gear is provided with four teeth, which necessitates the rotating of the shaft 61 but a quarter of a revolution for each operation of the machine, thereby reducing the speed of said shaft to one-fourth of that necessary where a single tooth is employed, and thus facilitating the operation of the machine.

The recording mechanism is provided with counters for recording the total amount of cash received during a trip and during a day, and in order to actuate these counters it is necessary to provide some means for rotating the primary counter thereof a number of units equal to the number of cents of the fare received. To accomplish this, we provide the total-cash counters on the resetting-shafts 10 and 13 with double actuating-gears 65 and 66, the gear 65 being of greater diameter than the gear 66, the gears rotating in unison to operate the primary counter of the recording mechanism. Upon the actuating-shaft 61 we provide a sleeve 67, having rigidly secured thereto gears 68 and 69 of different diameters and adapted to mesh, respectively, with the gears 66 and 65 on the shafts 10 and 13. The gears 68 and 69 are separated by a space equal to or greater than the thickness of either of the gears 65 or 66, so that but one set of gears can be in mesh at the same time. The shaft 61 is provided with a pin or other suitable stop 70 to limit the outward movement of the sleeve 67, which is held normally in contact with said pin by a spring 71, coiled about the shaft and bearing at one end against the sleeve 67 and at the other end against the bearing 72 for the ends of said shaft or against a fixed part of the frame. The ratio of the gears 69 and 65 is such that when they are in mesh the quarter-revolution of the shaft 61, which is imparted thereto to advance the recording-counters the space of one unit upon the registration of a three-cent fare, will advance the total-cash counters the space of three units, and the ratio of the gears 68 and 66 is such that when they are in mesh a quarter-rotation of the shaft imparted to register a five-cent fare will rotate said total-cash counters the space of five units. When the sleeve 67 is in its normal position at the outer limit of its movement, these gears are out of mesh and the total-cash counters are not operated by the operation of the shaft 61. Rigidly secured to the end frame member 1 is a bracket 73, provided with bearing-lugs 74, in which is journaled a rock-shaft 75, provided with a downwardly-extending arm 76, having a yoke 77 at its lower end, which in turn is provided with inwardly-extending pins or lugs 78, engaging with the groove 79 in the sleeve 67. A second arm 80 is also rigidly secured to the rock-shaft 75 and extends, when in its normal position, substantially parallel with the screw-shaft 41 and is provided with an open-ended cam-slot 81, the open end of which when the arm is in its normal position lies in the path of a pin 82, carried by the nut 47, moving on the shaft 41. The length and contour of the cam-slot 81 is such that when the nut 47 is moved to a position to bring the actuating-gear into mesh with the gear of the three-cent-fare counter the arm will be depressed a distance sufficient to bring the gear 69 on the sleeve 67, through the medium of the yoke 77, into mesh with the gear 65, and when the nut 47 is further advanced to move the actuating-gear 63 into alinement with the gear of the five-cent-fare counter, the arm 80 is further depressed and the gear 68 moved into mesh with the gear 66, this movement carrying the gear 69 beyond the gear 65 and allowing it to rotate free of the same. When the nut 47 is moved to carry the actuating-gear away from the cash-fare counters, the pin 82, moving in the cam-slot 81, raises the arm 80 and returns the sleeve 67 to its normal position, thereby positively moving the actuating-gears out of engagement with the counters. The spring 71 serves to hold the actuating-gears in their normal position and prevent accidental engagement with the counters.

As above stated, the shaft 61, carrying the actuating-gears, extends longitudinally of and parallel with the resetting-shafts 10 and 13, which carry the counters and their operating-gears. This shaft is journaled at one end in the end frame member 1 of the machine and at the other end is journaled upon a sleeve 83 which in turn is journaled in the end member 2 of the frame. The sleeve 83 extends slightly beyond the frame member on each side thereof and is provided on its inner end with a pinion 84, rigidly secured thereto, and on its outer end is provided with a plate 85, also rigidly secured thereto and having radially-extending arms 86, which are provided with pawls 87, pivoted to the outer faces thereof and having springs 88 mounted between the inner faces of the rearwardly-projecting ends thereof and engaging shoulders 89 on the plate 85, thereby tending to move the inner ends of the pawls 87 toward the shaft 61. Rigidly secured to the shaft 61 on the outer side of the plate 85 is a ratchet-wheel 90, which in the present instance is provided with four teeth to correspond with the four teeth of the actuating-gear 63. The ratchet-wheel 90 is located close to the face of the plate 85 and its teeth are adapted to be engaged by the inner ends of the pawls 87. The ratchet-wheel is rigidly secured to the shaft 61 by means of a collar 91, with which it is preferably formed integral. Thus it will be seen that when the pinion 84 is rotated the plate 85 rotates therewith, bringing the pawls 87 into contact with the teeth of the ratchet-wheel 90 and moving the same forward a distance equal to the rotation of the pinion 84, and that when the pinion 84 is rotated in the opposite direction the pawls 87 will ride over the teeth of the ratchet-wheel 90 without imparting any movement to the same, thereby allowing the shaft 61 and the actuating-gear 63 to be rotated the space of a single tooth at each forward movement of the pinion and to remain in its advanced position when the pinion is returned to its normal position. The sleeve 83 may, if desired, be constructed as that shown in the drawings, which is divided in two parts, the inner part carrying the pinion 84 and the outer part the plate 85, these two portions having their inner ends interlocking, as shown at 83ª, this construction permitting of the pinion and plate being formed integral with or rigidly secured to their respective sleeve members before the machine is assembled and simplifying the operation of assembling the machine.

Rigidly secured to the inner face of the end frame member 2 immediately above the shaft 61 and the pinion 84 is an inwardly-extending plate 92, provided with brackets or feet 93 for securing the same to the end of the frame. This plate has its upper surface smooth to form a bearing-surface and has its inner edge adjacent to the frame member 2 cut away for the greater part of the length of the plate, as shown at 94, leaving only the supporting feet or brackets 93 at the ends of the plate, and is further provided with a transverse slot or groove 95, extending parallel with the shaft 61 and provided with a flaring outer end 96. The plate 92 is also provided at its forward end with a series of bearing-lugs 97. A second plate 98, having its lower surface smooth to form a bearing-surface, is slidably mounted upon the plate 92 and is retained thereon by means of bolts 99, extending through longitudinal slots 100 in the plate 98 and engaging the lower plate 92, thereby securing the upper plate firmly to the lower plate, but allowing the same a free longitudinal movement thereon. The plate 98 is provided at its rear end with a downwardly-extending rack 101, provided with teeth 102, adapted to extend through the opening 94 in the lower plate 92 and mesh with the teeth of the pinion 84. The plate 98 is provided with a diagonal transverse slot 103, extending at an angle to the shaft 61 and having its forward end in open communication with the recess 104, formed in the forward end of the plate 98 by cutting away a portion of the material and depressing the forward portion of the plate to form a recess, as shown at 105. When the plate 98 is in its normal position upon the plate 92, the forward ends of the slots 95 and 103 are in vertical alinement.

The sleeve 45, which is journaled in the end frame member 2 and receives the end 44 of the shaft 41, has mounted on the inner end thereof a substantially triangular block 106, having on each side thereof a lug or pin 107, so located that when the side of the block 106 is parallel with the plate 98 the pin 107 will be in alinement with the groove 103 therein and consequently with the groove 95 in the plate 92. The pins 107 may be of any suitable construction, but we prefer to provide the same with rototary sleeve-bearings 108 and 109, which are so mounted upon the pins 107 as to be capable of movement in either the same or opposite directions. The block 106 has its corners preferably cut away, as shown at 110, and provided with pins 111. The sleeve 45 extends beyond the end frame member 2 and beyond the shaft 41 and is provided on its outer end with means for attaching the same to suitable operating mechanism. In the present instance this means takes the form of a bifurcated end 112, adapted to form one member of a universal joint, whereby the sleeve 45 and the shaft 41 are connected to an actuating-rod carried by the operating mechanism which is mounted in the car. When the sleeve 45 has been rotated to set the actuating-gear in operative relation with one of the counters, one of the pins 107 on the block 106 will be in alinement with the open ends of the slots 95 and 103, and as the sleeve 45 is moved outward this pin is caused to enter these slots. As the pin is of sufficient length to extend through the upper slot 103 and into the lower slot 95, it is obliged to move in a straight line parallel with the shaft 61, and the upper end thereof coming in contact with the edge of the diagonal slot 103 causes the plate 98 to slide longitudinally of the plate 92, thereby moving the rack 101 over the pinion 84 and rotating the same, and consequently imparting forward movement to the shaft 61 and actuating-gear 63. The inclination of the slot 103 and the ratio of the teeth of the rack 101 and of the pinion 84 are such as to impart a quarter-revolution to the shaft 61, but in order to insure the accurate movement of the shaft and to prevent any overthrow of the same we provide thereon a plate 113, having four arms 114, extending at right angles to each other and corresponding to the teeth 64 of the actuating-gear 63. These teeth are provided in their outer ends with V-shaped recesses 115, adapted to be engaged by the correspondingly-shaped nose 116 of the spring-pressed pawl 117, which is mounted on a stationary part of the machine. The inclination of the nose 116 of the pawl and the V-shaped recesses 115 is such that when power is applied to the shaft 61 the pawl 117 will be moved back against the tension of its spring, and the arm will move past the same, allowing the shaft to rotate until the next arm 115 comes in engagement with the pawl 117 and the nose of said pawl enters the recess 115 of this arm. As the rack 101 approaches the limit of its movement a downwardly-extending projection 114ª, carried by the sliding plate 98, moves into the path of the arms 114 and is engaged by one of the arms as the shaft 61 rotates, thus preventing the rotation of the actuating-gear through a greater distance than a quarter of a revolution. When one arm is in engagement with the projection 114ª, the pawl 117 is in engagement with the opposite arm and serves to prevent any movement of the shaft as the rack 101 returns to normal position. The sleeve 45 is provided with two annular grooves 118 and 119, the groove 118 being formed in that portion of the sleeve which lies just beyond the outer face of the frame member 2 when the sleeve is in its innermost position and the groove 119 being formed in that part of the sleeve which lies just beyond the outer face of said frame member when the sleeve is in its outermost position. That portion of the sleeve lying between the annular grooves 118 and 119 is provided with a plurality of series of notches or detent-teeth 120, extending for the full length of that portion of the sleeve. There are preferably three series of detent-teeth 120, arranged on the sleeve 45 substantially in alinement with the pins 111 on the block 105. The outer groove 118 is adapted to receive the locking-plate 21 of the lever 20 and hold the operating mechanism against movement when the conductor has removed his key from the keyway 31.

The end frame member 2 is provided with a pair of bearing-lugs 121, in which is mounted a rock-shaft 122, carrying a downwardly-extending rib or blade 123, adapted to lie in one of the grooves 118 or 119 when the sleeve is in its innermost or outermost position, respectively. When the sleeve is moved from its innermost position, the rib 123 on the rock-shaft 122 engages the edge of the sleeve adjacent to said groove and turns the shaft in its bearings to allow the rib to ride over the detent-teeth 120. The direction of movement of the rock-shaft 122 is of course in a direction to allow the rib 123 to rise when the sleeve is moved outward, but to positively engage the detent-teeth when the sleeve is moved backward, thus locking the same against rearward movement until a complete stroke has been performed and the rib has entered the groove 119 at the opposite end of the sleeve. As the sleeve is returned to its normal position the rib and the rock-shaft 122 are turned in the opposite direction, and the operation is the same as before and serves to prevent the outward movement of the sleeve until it has completed its inward stroke. In order to hold the rib 123 positively in engagement with the teeth 120, we provide the outer end of the shaft 122 with an arm 124, extending, preferably, at right angles to the rib 123 and extending into a recess 125 in the end frame member 2, where it is secured to one end of a spring 126, the opposite end of which is secured to a pin 127, carried by a bracket 128, secured on the inner end of said frame member. As it will be seen, the tension of the spring 126 serves to hold the rib 123 normally in its lowermost position and to move the same positively into engagement with the detent-teeth 120 when the sleeve 45 is moved.

A suitable bell-ringing mechanism is provided and adapted to be operated at each outward stroke of the sleeve 45, and consequently the bell is sounded at each registration of a fare. This mechanism preferably consists of a plate 129, secured to the end frame member 2 and provided with inwardly-extending arms 130 and 131. Near the outer end of the arm 130 is pivotally mounted a lever 132, provided at its free end with a hammer 133, adapted to engage the gong 134, which is suitably mounted upon the frame member 3. The arm 131 has its outer end turned upward to form a stop 135, which is adapted to engage the lever 132 and hold the same in such a position that the hammer 133 is normally out of engagement with the gong, being separated therefrom by a very slight space. Near its point of pivotal connection the lever 132 is provided with oppositely-extending arms 136 and 137, the arm 136 being provided with an upturned end 138, provided with a stud 139, adapted to receive one end of a coiled spring 140, the opposite end of which engages the stud 141 on a fixed part of the bracket 129, the tension of the spring being such as to normally hold the lever 132 in engagement with the stop 135. A pawl 142 is centrally pivoted to the lever 132 at 143 and has its rear end connected to one end of a spring 144, the opposite end of which is secured to a pin 145, fixed near the outer end of the arm 137. The tension of the spring is such as to normally draw the rear end of the pawl 142 against a pin 146, fixed in the arm 132, which limits the rearward movement of said pawl. The opposite end of the pawl extends beyond the pivot 143 and has its rear edge slightly beveled, as shown at 147. This beveled end 147 of the pawl 142 lies in the path of the pin 111 on the lug 107 of the operating-block 106, carried by the sleeve 45, and when this sleeve is moved outward to operate the actuating-shaft the pin 111 engages the forward end of the pawl 142, and as the same is held against movement in the direction of movement of the pin the pawl is carried along with the pin and carries with it the lever 132. The length of the forward end of the pawl 142 is such that as the sleeve approaches the outer limit of its stroke the pin 111 passes beyond the end of the pawl, thereby releasing the lever 132 and allowing the same to move forward under the tension of the spring 140. The resiliency of the arm 132 is sufficient to allow the hammer 133 to come in contact with the gong 134 when the arm 132 is brought violently into contact with the stop 135 and to remove the same immediately out of contact with the bell, thereby preventing any interruption of sound-vibrations thereof. As the sleeve is returned to its normal position the pin 111 engages the beveled side 147 of the pawl 142 and turns the same on its pivot 143 against the tension of the spring 144 and moves past the same without moving the arm 132.

When the actuating-gears 68 and 69 are in mesh with the total-cash-counter gears 66 or 65, the operation of either of the resetting-shafts 10 or 13 would result in the movement of the gear 68 or 69, and consequently of the counter-gears 66 or 65, resulting in the disarrangement and possible breakage of the parts. Therefore it is desirable that when the machine is set to register a cash-fare, at which time the gears are in their operative relation, that the resetting-shafts should be locked against movement. To accomplish this, we provide a bell-crank lever 148, having its downwardly-extending arm provided with a recess 149, forming a hook and adapted to engage a pin 150 on the gear-segment 151, forming a part of the printing apparatus. The upper arm of the lever 148 has a cam-shaped lower surface 152, adapted to be engaged by a pin 153, carried by a gear 154, mounted on the outer face of the frame member 1 and meshing with the gear 43 on the operating-shaft 41. The ratio of the teeth on the gears 43 and 154 is such that when the shaft 41 has been rotated to bring the actuating-gear 63 into operative relation with the cash-counters the pin 153 will have been moved into engagement with the cam-surface 152 on the upper arm of the lever 148, moving the lever about its pivot and bringing the hook-shaped recess 149 on the lower arm thereof into engagement with the pin 150 on the gear-segment 151 of the printing mechanism, thereby locking the printing mechanism against operation so long as the pin 153 is in engagement with the upper arm of the lever 148. The cam-surface 152 of this arm is such that the pin 153 will remain in engagement therewith and hold the same in its elevated position so long as the actuating-gear 63 is in operative relation with either of the cash-counters. When the actuating-gear has moved out of operative relation with the cash-counter gears and the pin 153 has moved away from the cam-surface 152 of the upper arm of the lever 148, thereby releasing this arm, the same is returned to its lowermost position by means of a spring 153$^a$, one end of which is secured to the upper arm of said lever and the other end to a fixed part of the frame. As above stated, the resetting-shafts are each locked against movement until the printing mechanism has been actuated to print a record from their respective counters. Consequently the locking of the gear-segment 151 of the printing mechanism effectually locks the resetting mechanism against operation.

Mounted in the forward part of the end frame members 1 and 2 and extending parallel with the operating-shaft is an indicator-shaft 155, having rigidly secured thereto near one end thereof a cylindrical drum 156, having printed on the periphery thereof a series of designations of the several fares adapted to be recorded by the machine, any one of which may be brought opposite the sight-aperture in the casing, so as to be visible to the passengers in the car, indicating the fare which has been registered. The inner end of this drum is provided with a series of pins or lugs 157, extending around the edge of the periphery thereof parallel with the cylindrical surface of the drum. The shaft 155 extends beyond the outer face of the frame member 1 and is provided with a gear-wheel 158, which meshes with the gear 154, which in turn is actuated by the gear 43 on the operating-shaft 41, the ratio of these gears being such that when the operating-shaft 41 is rotated to move the actuating-gear 63 a distance equal to the space between two counters the shaft 155 will be rotated a distance sufficient to move the cylindrical surface of the drum 156 a distance equal to the space between two fare indications, thereby advancing the drum step by step with the actuating-gear and always indicating through the sight-aperture in the casing the particular fare which the actuating-gear is set to actuate.

In order to conceal the indications on the surface of the drum 156 from view while the machine is being actuated, we provide a shield 159, adapted to be moved in front of the sight-aperture of the casing while the operating-shaft is being operated to bring the actuating-gear in alinement with the proper counter and to register the fare and to be removed from in front of said sight-aperture when the fare has been registered, thereby indicating which fare has been registered. The shield 159 is mounted upon the forward arm of a bell-crank lever 160, the rear arm of which extends on the opposite side of the shaft and is secured to one end of a spring 161, the opposite end of which is secured to a fixed part of the machine 162 and which tends normally to depress the rear end of the lever 160 and raise the shield 159 to its elevated position in front of the sight-aperture of the casing. In the rear of the shaft 155 and extending parallel thereto is a shaft 163, journaled in the end members of the frame and provided at one end with a coiled spring 164, having one end secured to the end member of the frame and the opposite end secured to a collar 165, rigidly secured to the shaft 163, the tension of the spring being in a direction tending to move the upper side of the shaft forwardly. The opposite end of the shaft 163 is provided with an arm 166, (see Fig. 13,) which when the operating mechanism is in its normal position rests upon a projection 167 from the sliding plate 98 of the operating mechanism, thereby tending to hold the shaft 163 elevated against the tension of the spring 164. When the plate 98 moves transversely of the shaft 163 under the influence of the operating mechanism, the projection 167 moves from beneath the arm 166 and allows the shaft to revolve in a forward direction under the influence of said spring, the movement of the shaft being limited by the engagement of the arm 166 with the lower plate 92 of the operating mechanism.

Mounted upon the shaft 163 is a sleeve 168, having a forwardly-extending arm 169, to the forward end of which is pivoted an arm 170, extending downwardly toward the shaft 155 and provided near its lower end with a hook 171, adapted to engage a pin 172, carried by the inner arm of the bell-crank lever 160. The arm 170 is provided with an upwardly-extending projection 173, to which is secured one end of a spring 174, the opposite end of which is secured to a similar projection 175 on the sleeve 168, thereby tending to move the arm 170 normally forward toward the front of the machine. The lower end of the arm 170 is beveled, as shown at 176. The arm 170 is provided with a forwardly-extending projection 177, having a toe 178 extending between the pins 157 on the indicator-drum 156. The opposite faces of the toe 178 are beveled to engage the pins 157.

When the parts are in their normal position, which is that shown in Fig. 20 of the drawings, with the shield moved away from the sight-aperture of the casing and held in that position by the engagement of the hook 171 of the arm 170, with the pin 172 upon the supporting-lever of said shield, the operating-shaft 41 is actuated to alternate the position of the actuating-gear, and the indicator-shaft 155 is rotated therefrom, moving the drum 156 and bringing one of the pins 157 in contact with the beveled surface of the toe 178 of the arm 177. The pin riding up the beveled surface depresses the arm 177, thereby moving the arm 170 about its pivotal connection to the arm 169 and moving the hook 177 out of engagement with the pin 172, thereby allowing the spring 161 to rock the lever 160 about the shaft 155 and move the shield 159 in front of the sight-aperture in the casing. As the operating mechanism is actuated to register a fare the projection 167 moves out from under the arm 166, allowing the shaft 163 to move forward under the tension of the spring 164, thereby moving the arm 169 downwardly and bringing the beveled nose 176 of the arm 170 into engagement with the pin 172, thereby retracting the arm and allowing the hook 171 to engage said pin under the influence of the spring 174. As the operating mechanism is returned to its normal position the projection on the plate 98 again engages the arm 166 and raises the shaft 163, and consequently the arm 166 and the arms 169 and 170, thereby moving the lever 160 against the tension of the spring 161 and moving the shield 159 away from the sight-aperture and exposing to view the indication of the fare which has been registered.

Loosely mounted upon the indicator-shaft 155 is a group of total-fare counters 179, 180, and 181, adapted to be operated, respectively, by the several trains of gearing 182, 183, and 184, which are actuated from the operating-gears. These indicating-wheels are adapted to be moved at each operation of the registering mechanism, so that they always show through a sight-aperture in the casing the total number of fares collected on that particular trip, and are adapted to be reset at the end of each trip from the resetting mechanism of the trip-counters. To prevent the overthrow of the indicator-wheels when they are actuated to indicate the fares, we provide the same with a series of teeth or projections 185, formed along one edge of the rim thereof and extending parallel with said rim. Rigidly secured to the shaft 163 are a series of arms 186, extending above the indicator-wheels and in alinement with the teeth 185 carried thereby and normally out of engagement with the same, but adapted upon the forward movement of the shaft 163, when the same is released upon the operation of the registering mechanism, to be moved forward into the path of the said projections 185 and engage the same to prevent the indicator-wheels from moving beyond the proper point, the arms being raised out of engagement therewith when the operating mechanism is returned to its normal position and the shaft 163 again turned against the tension of the spring 164. In order to prevent the overthrow of these same indicator-wheels upon the resetting thereof at the end of the trip, we provide a plate 187, loosely supported from the shaft 163 by the arms 188 and having at its lower end a plurality of projections 189, in alinement with the teeth 185 of the indicator-wheels and normally out of engagement therewith, being held in normal position by gravity. Loosely mounted upon the transverse shaft 12 is an arm 190, extending upwardly to a point immediately in the rear of the plate 187 and provided near its lower end with a nose or projection 191, lying in the path of a lug or tooth 192, carried by the resetting-shaft 10. This tooth 192 is so positioned on the resetting-shaft 10 that when said shaft is rotated to reset the counters to their zero position the tooth 192 will engage beneath the nose 191 just before the shaft reaches its zero position and will force said projection upward, thereby swinging the upper end of the arm 190 into engagement with the plate 187 and moving the same forward, thus carrying the teeth 189 in the path of the teeth 185 on the indicator-wheels as they are turned to reset the same to zero position, and, coming into contact with the same, forms a stop to prevent them moving beyond their proper position.

Secured on the shaft 155, near the opposite end thereof, is an arm 193, carrying a segmental shield or indicator-plate 194, upon the outer face of which are the words "In" and "Out," arranged one above the other and indicating the direction in which the car is traveling when the fare is registered, as indicated by the indicator-wheels of the machine. This shield is provided with means for shifting the same with each operation of the resetting mechanism. The arm 193 is carried by a sleeve 195, which is secured to one end of a coiled spring 196, coiled about the end of the shaft 155 and secured at its opposite end to a fixed part of the end frame member 2, the tension of the spring being such as to normally tend to hold the shield in its uppermost position, thereby exposing to view through the sight-aperture in the casing the lower indication, which in this instance is "Out." The sleeve 195 has a rearwardly-projecting arm 197, having a portion of its rear end cut away to form a tooth or projection 198, which extends beyond the shaft 199, carried by the bearing-lugs 97 of the plate 92 of the operating mechanism. On this shaft is mounted a pinion 200, meshing with a gear 11 on the transfer-shaft 12, which in turn is adapted to be engaged by a mutilated gear 202, carried by the resetting-shaft 10 and provided with a sufficient number of teeth to rotate the gear 200 a half-revolution and having the remainder of its periphery plane, so that the gear 200 is not affected by a further rotation of the gear 202. A pin 203, carried by the gear 200, comes in contact with the arm 197 as the gear is rotated and raises the arm to its highest position, thereby depressing the arm 193 against the tension of the spring 196, thus lowering the indicator 194 and exposing the upper indication to view. The teeth on the gear 202 are so arranged that the gear 200 is stopped with the pin 203 still in engagement with the arm 197 and holding the same in its highest position, in which position it remains until the resetting-shaft 10 is again operated, when the gear 202 is again revolved a half-revolution, releasing the arm 197 and allowing the arm 193 to be raised by the spring 196, the upward movement of the arm 193 being limited by the projection 198 coming in contact with the hub of the gear 200.

Mounted in the rear of the frame and journaled at its opposite ends in the end members thereof is a shaft 204, carrying on its central portion a rearwardly-extending arm or plate 205, which extends out above the paper-roll 206, which is mounted in the rear of the machine. At the outer end of the shaft 204, where it projects beyond the end frame member 1, is provided an arm 207, having secured thereto one end of a spring 208, the opposite end of which is fixed to the stationary part of the frame, the tension of the spring tending to hold the arm 205 normally in engagement with the surface of the paper-roll 206. The outer end of the arm 204 is also provided with a pointer 209, which is located on the outer side of the casing which incloses the machine and travels over the scale formed thereon to indicate the amount of paper on the roll 206. It will be seen that when there is a full roll of paper the arm 205 will be raised to an elevated position, moving the pointer 209 to a higher position on the scale. As the paper is gradually fed off the roll the arm 205 moves downward, always engaging the surface of the roll, thereby causing the pointer 209 to travel along the scale to indicate the exact amount of paper on the roll.

We wish it to be understood that we do not desire to be limited to the exact details of construction shown and described, for obvious modifications will occur to a person skilled in the art.

Having thus fully described our invention, what we claim as new, and desire to secure by Letters Patent, is—

1. In a machine of the character described, the combination, with a plurality of alined counters, an actuating-shaft extending parallel thereto, an actuating member movable longitudinally of said shaft and rotatable therewith a second shaft parallel to said actuating-shaft, and a member mounted to move longitudinally on said second shaft and connected to said actuating member, of a single mechanism for moving said member on said second shaft to move said actuating member into operative relation with one of said counters and for rotating said actuating-shaft to cause said actuating member to actuate said counter, substantially as described.

2. In a machine of the character described, the combination, with a plurality of alined counters, an actuating-shaft extending longitudinally thereof, an actuating member mounted on said shaft, movable longitudinally thereof and rotatable therewith, a screw-shaft, and means carried thereby and engaging said actuating member to move the same longitudinally of said actuating-shaft, of a single mechanism for rotating said screw-shaft to move said actuating member into operative relation with one of said counters and for rotating said actuating-shaft to cause said actuating member to actuate said counter, substantially as described.

3. In a machine of the character described, the combination, with a plurality of alined counters, an actuating-shaft extending parallel thereto, and an actuating-gear movable longitudinally of said shaft and rotatable therewith, of a screw-shaft extending parallel to said actuating-shaft, a nut mounted on said screw-shaft and adjustable lugs extending through the sides of said nut and engaging a thread in said screw-shaft, means for connecting said nut to said actuating-gear, means for rotating said screw-shaft to move said actuating-gear into operative relation with one of said counters, and means for rotating said actuating-gear to actuate said counter, substantially as described.

4. In a machine of the character described, the combination, with a plurality of alined counters, an actuating-shaft extending parallel thereto, and an actuating-gear movable longitudinally of said shaft and rotatable therewith, of a shaft extending parallel thereto and having a spiral groove therein, a nut mounted on said shaft having a T-shaped slot in the side thereof, said slot having an aperture in the rear wall thereof, a guide-plate in said T-shaped slot, a bolt having one end extending through the apertures in said guide-plate and in the wall of said slot and engaging the groove in said shaft, a nut on the outer end of said bolt, means for rotating said shaft to move said actuating-gear into operative relation with one of said counters, and means for rotating said actuating-gear to actuate said counter, substantially as described.

5. In a machine of the character described, the combination, with a plurality of alined counters, an actuating-shaft extending parallel thereto, a four-toothed actuating-gear movable longitudinally of said shaft and rotatable therewith, of a screw-shaft extending parallel to said actuating-shaft, a nut carried by said screw-shaft and connected with said actuating-gear, means for rotating said screw-shaft to move said actuating-gear into operative relation with one of said counters, and means for rotating said shaft through one-quarter of a revolution to move said actuating-gear forward the space of one tooth, substantially as described.

6. In a machine of the character described, the combination, with a plurality of alined counters, an actuating-shaft extending parallel thereto, and an actuating-gear movable longitudinally of said shaft and rotatable therewith, of a screw-shaft extending parallel to said actuating-shaft, a nut mounted thereon and connected with said actuating-gear, and means carried at one end of said screw-shaft for rotating the same to move said actuating-gear into operative relation with one of said counters and to rotate said actuating-gear and actuate said counter, substantially as described.

7. In a machine of the character described, the combination, with a plurality of alined counters, and an actuating member movable longitudinally of said counters, of an operating mechanism adapted to be rotated to move said actuating member into operative relation with one of said counters and to be reciprocated to cause said member to actuate said counter, substantially as described.

8. In a machine of the character described, the combination, with a plurality of alined counters, an actuating-shaft extending parallel thereto, and an actuating member movable longitudinally of said shaft and rotatable therewith, of an operating member adapted to be rotated to move said actuating-gear longitudinally of said shaft to bring the same into operative relation with one of said counters and to be reciprocated to rotate said actuating-gear and actuate said counter, substantially as described.

9. In a machine of the character described, the combination, with a plurality of alined counters, an actuating-shaft extending longitudinally thereof, and an actuating-gear movable longitudinally of said shaft and rotatable therewith, a screw-shaft extending parallel with said actuating-shaft, and a nut carried thereby and connected with said actuating-gear, of an operating member adapted to be rotated to rotate said screw-shaft and move said actuating-gear into operative relation with one of said counters and to be reciprocated to impart rotatory movement to said actuating-shaft to cause said actuating-gear to actuate said counter, substantially as described.

10. In a machine of the character described, the combination, with a plurality of alined counters, an actuating-shaft extending parallel thereto, and actuating-gear movable longitudinally of said shaft and rotatable therewith, a screw-shaft extending parallel with said actuating-shaft, and a nut mounted thereon and connected with said actuating-gear, of a sleeve mounted on said screw-shaft and adapted to be rotated to impart a rotatory movement to said screw-shaft and move said actuating-gear into operative relation with one of said counters and to be reciprocated longitudinally of said shaft to impart a rotatory movement to said actuating-shaft to cause said actuating-gear to actuate said counter, substantially as described.

11. In a machine of the character described, the combination, with a plurality of alined counters, an actuating-shaft having a pinion at one end thereof, an actuating-gear movable longitudinally of said shaft and rotatable therewith, a screw-shaft, and a nut carried by said screw-shaft and connected with said actuating-gear, of a rack meshing with said pinion, a sleeve on the outer end of said screw-shaft adapted to impart a rotatory motion to said screw-shaft to move said actuating-gear into operative relation with one of said counters and to be reciprocated to move said rack transversely of said shaft to rotate the same and cause said actuating-gear to actuate said counter, substantially as described.

12. In a machine of the character described, the combination, with a plurality of alined counters, an actuating-shaft extending parallel thereto and having a pinion at one end thereof, an actuating-gear movable longitudinally of said shaft and rotatable therewith, a screw-shaft extending parallel to said actuating-shaft, and a nut carried by said screw-shaft and connected with said actuating-gear, of a plate movable transversely of said actuating-shaft, a rack carried by said plate and meshing with said pinion, a sleeve mounted on one end of said screw-shaft and adapted, when rotated, to impart a rotatory movement to said screw-shaft to move said actuating-gear into operative relation with one of said counters, and, when reciprocated, to move said plate and rack transversely of said actuating-shaft, imparting a rotatory movement thereto and causing said actuating-gear to actuate said counter, substantially as described.

13. In a machine of the character described, the combination, with a plurality of alined counters, an actuating-shaft extending parallel thereto and having a pinion at one end thereof, and an actuating-gear movable longitudinally of said shaft and rotatable therewith, of a screw-shaft, a nut mounted on said screw-shaft and connected with said actuating-gear, a plate having a slot therein extending diagonally of said actuating-shaft, a rack carried by said plate and meshing with said pinion, a sleeve mounted on the end of said screw-shaft and rotatable therewith, and means carried by said sleeve for engaging the slot of said plate and causing said rack to move transversely of the actuating-shaft and rotate said actuating-gear, thereby actuating said counter, substantially as described.

14. In a machine of the character described, the combination, with a plurality of alined counters, an actuating-shaft extending parallel thereto and having a pinion near one end thereof, an actuating-gear movable longitudinally of said shaft and rotatable therewith, a screw-shaft extending parallel with said actuating-shaft, and a nut carried thereby and connected with said actuating-gear, of a plate movable transversely of said screw-shaft and having a slot extending diagonally thereof, a rack carried by said plate and meshing with said pinion, a sleeve mounted on one end of said screw-shaft to rotate therewith and reciprocate thereon, a pin carried by said sleeve and a bearing-sleeve mounted on said pin and adapted to engage the slot in said plate when said sleeve is reciprocated and cause said rack to move transversely of said actuating-shaft to impart a rotatory movement thereto, substantially as described.

15. In a machine of the character described, the combination, with a plurality of alined counters, an actuating-shaft extending parallel thereto and having a pinion at one end thereof, an actuating-gear movable longitudinally of said shaft and rotatable therewith, a screw-shaft, and a nut carried by said screw-shaft and connected with said actuating-gear, of a plate movable transversely of said actuating-shaft and having a slot extending diagonally of said screw-shaft, a rack carried by said plate and engaging said pinion, a sleeve movable longitudinally of said screw-shaft and rotatable therewith, a substantially triangular block carried by said sleeve, lugs mounted on each face of said block and adapted to engage said diagonal slot to reciprocate said plate when said sleeve is reciprocated on said screw-shaft, thereby rotating said actuating-gear, substantially as described.

16. In a machine of the character described, the combination, with a plurality of alined counters, an actuating-shaft extending parallel thereto and having a pinion at one end thereof, an actuating-gear movable longitudinally of said shaft and rotatable therewith, a screw-shaft extending parallel to said actuating-shaft, and a nut carried thereby and connected with said actuating-gear, of a plate movable transversely of said actuating-shaft and having a slot extending diagonally thereof, a rack carried by said plate and meshing with said pinion, a sleeve movable longitudinally of said screw-shaft and rotatable therewith, a pin carried by said sleeve and adapted to engage said slot, and a plurality of independent bearing-sleeves mounted on said pin, substantially as described.

17. In a machine of the character described, the combination, with a plurality of alined counters, an actuating-shaft extending parallel thereto and having a pinion at one end thereof, an actuating-gear movable longitudinally of said shaft and rotatable therewith, a screw-shaft extending parallel to said actuating-shaft, and a nut carried by said screw-shaft and connected to said actuating-gear, of a stationary plate, a second plate movable longitudinally on said first-mentioned plate, one of said plates having a slot extending parallel to said screw-shaft and the other plate having a slot extending at an angle to said first-mentioned slot, a rack carried by said movable plate and meshing with said pinion, a sleeve movable longitudinally of said screw-shaft and rotatable therewith, a pin carried by said sleeve and adapted to engage both of said slots, whereby, when said pin is moved longitudinally of the straight slot, it engages the side of the inclined slot of said movable plate and moves said plate transversely of said actuating-shaft, substantially as described.

18. In a machine of the character described, the combination, with a plurality of alined counters, an actuating-shaft extending parallel thereto, an actuating-gear movable longitudinally of said shaft and rotatable therewith, and means for moving said actuating-gear into operative relation with one of said counters, of a fixed plate mounted in said machine, a second plate movable on said fixed plate in a direction transverse to said actuating-shaft and having a rack meshing with said pinion, one of said plates having a slot extending parallel to said actuating-shaft and the other of said plates having a slot extending at an angle to said first-mentioned slot, a member reciprocating longitudinally of said actuating-shaft, and a lug carried by said reciprocating member adapted to engage both of said slots, thereby causing said movable plate to be actuated in a direction transversely to said shaft when said reciprocating member is actuated, substantially as described.

19. In a machine of the character described, the combination, with a plurality of alined counters, an actuating-shaft extending parallel thereto, an actuating-gear movable longitudinally of said shaft and rotatable therewith, and means for moving said actuating-gear into operative relation with one of said counters, of a fixed plate mounted in said machine and having a slot extending parallel with said actuating-shaft, a plate slidably mounted on said fixed plate and movable in a direction transverse to said shaft and having a slot extending at an angle to said first-mentioned slot, an operating member reciprocating longitudinally of said actuating-shaft and a projection carried by said reciprocating member and adapted to engage both of said slots, whereby said second plate is moved transversely of said shaft when said operating member is reciprocated, and a rack carried by said movable plate and meshing with said pinion, substantially as described.

20. In a machine of the character described, the combination, with a plurality of alined counters, an actuating-shaft extending parallel thereto and having a pinion near one end thereof, an actuating-gear moving longitudinally of said shaft and rotatable therewith, and means for moving said actuating-gear into operative relation with one of said counters, of a rack movable transversely of said shaft and meshing with said pinion, an actuating member reciprocating longitudinally of said actuating-shaft and operatively connected with said rack, substantially as described.

21. In a machine of the character described, the combination, with a plurality of alined counters, an actuating-shaft extending parallel thereto and having a pinion near one end thereof, an actuating-gear movable longitudinally of said shaft and rotatable therewith, and means for moving said actuating-gear into operative relation with one of said counters, of a rack movable transversely of said actuating-shaft and meshing with said pinion, an actuating member operatively connected with said rack and having a rotatory movement to operate said means for moving said actuating-gear into operative relation with one of said counters and a reciprocatory movement to move said rack transversely of said actuating-shaft to rotate the same and cause said actuating-gear to actuate said counter, substantially as described.

22. In a machine of the character described, the combination, with a plurality of alined counters, an actuating-shaft extending parallel thereto, a sleeve near one end of said shaft, a pinion carried by said sleeve, a ratchet mechanism connecting said sleeve with said shaft, an actuating-gear movable longitudinally of said shaft and rotatable therewith, and means for moving said actuating-gear into operative relation with one of said counters, of a rack movable transversely of said shaft and meshing with said pinion, and an operating mechanism operatively connected with said rack, substantially as described.

23. In a machine of the character described, the combination, with a plurality of alined counters, a sleeve rotatably mounted in said machine, a pinion at one end of said sleeve and pawls at the opposite end of said sleeve, an actuating-shaft extending longitudinally of said counters and journaled in said sleeve, one end of said shaft extending beyond said sleeve and having a ratchet thereon adapted to be engaged by said pawls, an actuating-gear movable longitudinally of said shaft and rotatable therewith, and means for moving said actuating-gear into operative relation with one of said counters, of a rack movable transversely of said shaft and meshing with said pinion, and an operating mechanism operatively connected with said rack, substantially as described.

24. In a machine of the character described, the combination, with a plurality of alined counters, an operating-shaft extending parallel thereto and having a pinion near one end thereof, an actuating-gear movable longitudinally of said shaft and rotatable therewith, and means for moving said actuating-gear into operative relation with one of said counters, of a rack movable transversely of said shaft and meshing with said pinion, an actuating member operatively connected with said rack, a detent-wheel mounted on said shaft and having recesses in the periphery thereof, and a pawl adapted to engage said recesses to prevent the overthrow of said shaft, substantially as described.

25. In a machine of the character described, the combination, with a plurality of alined counters, an actuating-shaft extending parallel thereto and having a pinion near one end thereof, an actuating-gear movable longitudinally of said shaft and rotatable therewith, and means for moving said actuating-gear into operative relation with one of said counters, of a rack movable transversely of said shaft and meshing with said pinion, an operating member reciprocating longitudinally of said shaft and operatively connected with said rack, detent-teeth extending longitudinally of said reciprocating member, and a detent carried by said machine and adapted to engage said teeth, substantially as described.

26. In a machine of the character described, the combination, with a main frame, a plurality of alined counters mounted therein, an actuating-shaft extending parallel thereto and having a pinion near one end thereof, an actuating-gear movable longitudinally of said shaft and rotatable therewith, and means for moving said gear into operative relation with one of said counters, of a rack movable transversely of said shaft and meshing with said pinion, an actuating member slidably mounted in said frame having detent-teeth extending longitudinally thereof, a detent pivotally mounted in said frame and adapted to engage said detent-teeth, substantially as described.

27. In a machine of the character described, the combination, with a plurality of alined counters, an actuating-shaft extending parallel thereto and having a pinion near one end thereof, an actuating-gear movable longitudinally of said shaft and rotatable therewith, a screw-shaft extending parallel to said actuating-shaft, and a nut carried thereby and connected to said actuating-gear, of a rack movable transversely of said actuating-shaft and meshing with said pinion, a sleeve movable longitudinally of said screw-shaft and rotatable therewith, means for operatively connecting said sleeve with said rack, annular grooves near the opposite ends of said sleeve, detent-teeth formed in the periphery thereof, between said annular grooves, a detent adapted to engage said annular grooves when said sleeve is at either the inner or outer limit of its movement and to engage said detent-teeth on said sleeve when said sleeve is in a position intermediate said limits of movement, substantially as described.

28. In a machine of the character described, the combination, with a plurality of alined counters, an actuating-shaft extending parallel thereto and having a pinion near one end thereof, an actuating-gear movable longitudinally of said shaft and rotatable therewith, a screw-shaft extending parallel to said actuating-shaft, and a nut carried by said screw-shaft and connected with said actuating-gear, of a rack extending transversely of said actuating-shaft and meshing with said pinion, a sleeve movable longitudinally of said screw-shaft and rotatable therewith, annular grooves near the opposite end of said sleeve, detent-teeth formed in the periphery of said sleeve extending between said grooves, a spring-held detent normally in engagement with one of said annular grooves and adapted, when said sleeve is moved outward, to engage said detent-teeth and prevent the backward movement thereof and to engage the other of said annular grooves when said sleeve has reached the outer limit of its movement and to ride over said teeth in the opposite direction when said sleeve is returned to its normal position, substantially as described.

29. In a machine of the character described, the combination, with a plurality of individual fare-counters, a total-cash counter in alinement with said individual counters, an actuating-shaft extending parallel to said counters, an actuating-gear for said individual counters mounted on said actuating-shaft and movable longitudinally thereof and rotatable therewith, and means for moving the same into operative relation with one of said counters, of an actuating-gear for said total-cash counters mounted on said actuating-shaft movable longitudinally thereof and rotatable therewith, means for moving said actuating-gear into operative relation with the total-cash counters when said individual actuating-gear is moved into operative relation with the cash-counter, and means for rotating said actuating-shaft to actuate said counters, substantially as described.

30. In a machine of the character described, the combination, with a plurality of individual cash-fare counters, a total-cash counter in alinement with said individual counters, an actuating-shaft extending parallel to said counters, an actuating-gear for the individual counters movable longitudinally of said shaft and rotatable therewith, and means for moving said actuating-gears into operative relation with one of said counters, of a plurality of actuating-gears for said total-cash counters movable longitudinally of said shaft and rotatable therewth, and means for bringing one of said actuating-gears into operative relation with said total-cash counter when said individual actuating-gear is in operative relation with one of said cash-fare counters, substantially as described.

31. In a machine of the character described, the combination, with a plurality of individual cash-fare counters, a total-cash counter in alinement therewith, an actuating-gear for said individual fare-counters, and means for moving said actuating-gear into operative relation with one of said counters, of a plurality of gears of different diameters secured to said total-cash counter and rotatable therewith, a plurality of actuating-gears of different diameters adapted to mesh with the counter-gear respectively, and means for moving said actuating-gear into engagement with the respective counter-gear when said actuating-gear for the individual counters is moved into operative relation with one of said cash-counters, substantially as described.

32. In a machine of the character described, the combination, with a plurality of individual cash-fare counters, a total-cash counter in alinement therewith, an actuating-shaft extending parallel to said counters, an actuating-gear movable longitudinally of said shaft and rotatable therewith, a screw-shaft extending parallel to said actuating-shaft, and a nut carried by said screw-shaft and connected with said actuating-gear, of a second actuating-gear movable longitudinally of said actuating-shaft and rotatable therewith, a bell-crank lever pivotally mounted above said actuating-shaft and having one end operatively connected to said last-mentioned actuating-gear, and means carried by said nut to engage the other arm of said bell-crank lever and move said actuating-gear into operative relation with said total-cash counter when said nut has been advanced to move said first-mentioned actuating-gear into operative relation with one of said individual cash-fare counters, substantially as described.

33. In a machine of the character described, the combination, with a plurality of individual cash-fare counters, an actuating-shaft extending parallel thereto, an actuating-gear movable longitudinally of said shaft and rotatable therewith, a screw-shaft extending parallel with said actuating-shaft, a nut carried by said screw-shaft and connected with said actuating-gear, and a pin carried by said nut, of a total-cash counter, an actuating-gear therefor movable longitudinally of said actuating-shaft and rotatable therewith, a rock-shaft having one arm operatively connected to said last-mentioned actuating-gear, a second arm pivotally secured to said rock-shaft and provided with a cam-shaped slot adapted to be engaged by the pin on said nut, whereby said rock-shaft is operated to move said actuating-gear into operative relation with said total-cash counter when said nut has been advanced to move said individual actuating-gear into operative relation with one of said cash-fare counters, substantially as described.

34. In a machine of the character described, the combination, with a plurality of alined fare-counters, an actuating-shaft extending parallel thereto and having a pinion in one end thereof, an actuating-gear movable longitudinally of said shaft and rotatable therewith, and means for moving said actuating-gear into operative relation with one of said counters, of a rack movable transversely of said actuating-shaft and meshing with said pinion, a reciprocating member operatively connected with said rack, a bell mounted on said machine, a bell-hammer pivoted near said reciprocating member, a spring holding said hammer normally in its foremost position, and a part carried by said reciprocating member adapted to engage said hammer and move the same against the tension of said spring, whereby said hammer is released and is moved violently into contact with said bell, substantially as described.

35. In a machine of the character described, the combination, with a plurality of alined fare-counters, an actuating-gear and a reciprocating member adapted to move said actuating-gear into operative relation with one of said counters, of a bell mounted on said machine, an inwardly-extending arm carried by said machine, a lever pivoted at one end to said arm and having a bell-hammer at the opposite end, a spring holding said lever normally in its forward position, a spring-held pawl pivoted to said lever, a stop for holding said pawl against movement in one direction, and a part carried by said reciprocating member adapted to engage said pawl and move said lever against the tension of said spring as said member is reciprocated in one direction and to move said pawl about its pivot when reciprocated in the other direction, substantially as described.

36. In a machine of the character described, the combination, with a plurality of alined counters, an actuating-gear therefor, a reciprocating member adapted to move said actuating-gear into operative relation with one of said counters, and a bell carried by said machine, of a bracket secured to said machine having two inwardly-extending arms, a lever pivoted to one of said arms and having a hammer at its outer end adapted to engage said bell, a stop on the second arm of said bracket adapted to limit the outward movement of said lever, a spring holding said lever normally in contact with said stop, a pawl pivoted to said lever, a stop limiting the movement of said pawl in one direction, a spring normally holding said pawl in engagement with said stop, and a part carried by said reciprocating member adapted to engage said pawl to move said lever against the tension of said spring when said member is moved outward and to engage said pawl and move the same about its pivot as said member is moved inwardly, substantially as described.

37. In a machine of the character described, the combination, with a plurality of individual cash-fare counters, an actuating-gear therefor, means for moving said actuating-gear into operative relation with one of said counters, a total-cash counter in alinement with said cash-fare counters, an actuating-gear therefor, and means for moving the same into operative relation therewith when said first-mentioned actuating-gear is moved into operative relation with one of said cash-fare counters, of means for resetting said counters to their zero position, and means for locking said resetting mechanism against operation when said last-mentioned actuating-gear is in operative relation with said total-cash counter, substantially as described.

38. In a machine of the character described, the combination, with a resetting-shaft, a plurality of individual cash-fare counters mounted on said shaft, an actuating-gear, means for moving the same into operative relation with one of said cash-fare counters, a total-cash counter mounted on said resetting-shaft, an actuating-gear for said total-cash counter, and means for moving said actuating-gear into operative relation with said total-cash counter when said first-mentioned actuating-gear is moved into operative relation with one of said cash-fare counters, of printing mechanism in operative relation with said counters, means actuated by said printing mechanism for controlling the movement of said resetting-shaft, and means for locking said printing mechanism against movement when said actuating-gear is in operative relation with said total-cash counter, substantially as described.

39. In a machine of the character described, the combination, with a resetting-shaft, a plurality of counters mounted on said resetting-shaft, and means for actuating said counters, of printing mechanism in operative relation with said counters, means carried by said printing mechanism controlling the movement of said resetting-shaft, a lever controlling said printing mechanism, a pin carried by said lever, a bell-crank lever having a recess in one arm thereof in alinement with said pin, a spring holding said recess normally out of engagement with said pin, a gear driven from said counter-actuating mechanism, a pin carried by said gear and adapted to engage the other arm of said bell-crank lever to move said recess into engagement with said pin and thereby lock said printing mechanism against movement, substantially as described.

40. In a machine of the character described, the combination, with a plurality of counters, an actuating member therefor, and operating mechanism for moving said actuating member into operative relation with one of said counters and for operating said actuating member to actuate that counter, of a shaft actuated from said operating mechanism, an indicator-drum rigidly mounted on said shaft, a shield adapted to cover the indication on said drum when said mechanism is being operated, and means for moving said shield away from said indication to expose the same to view when said operation has been completed, substantially as described.

41. In a machine of the character described, the combination, with a plurality of counters, an actuating member therefor, and operating mechanism for moving said actuating member into operative relation with one of said counters and for operating said actuating member to actuate that counter, of a shaft actuated from said operating mechanism, an indicator-drum rigidly mounted on said shaft, an arm pivoted on said shaft, a shield carried by said arm and extending across the face of said indicator-drum, a spring tending to hold said shield normally in its elevated position, and means controlled by said operating mechanism for moving said shield to its lowermost position when the operation thereof has been completed, substantially as described.

42. In a machine of the character described, the combination, with a plurality of counters, an actuating member therefor, and operating mechanism for moving said actuating member into operative relation with one of said counters and for operating said actuating member to actuate that counter, of a shaft actuated from said operating mechanism, an indicator-drum carried by said shaft, an arm journaled on said shaft, a shield carried at one end of said arm and extending across the face of said drum, a spring connected to the other end of said arm tending to hold said shield normally in its elevated position, a pin carried by said arm, and a hook carried by a movable part of said machine and controlled by said operating mechanism for engaging said pin to move said shield to its lowermost position when the operation of said mechanism has been completed, substantially as described.

43. In a machine of the character described, the combination, with a plurality of counters, an actuating member, and operating mechanism for moving said actuating member into operative relation with one of said counters for operating said actuating member to actuate said counter, of a shaft actuated from said operating mechanism, an indicator-drum mounted on said shaft, an arm journaled on said shaft, a shield carried at one end of said arm and extending across the face of said drum, a spring secured to the other end of said arm tending to hold said shield normally in front of the indication on said drum, a pin carried by said arm, a shaft extending parallel to said drum, an arm carried by said shaft, a member carried by said arm and adapted to engage said pin, a spring tending to rotate said shaft to move the member carried by said arm into engagement with said pin when said operating mechanism is actuated, and means for rotating said shaft in the opposite direction to actuate said member, thereby moving the shield away from the indication when the operating mechanism has returned to its normal position, substantially as described.

44. In a machine of the character described, the combination, with a plurality of counters, an actuating member therefor, and operating mechanism for moving said actuating member into operative relation with one of said counters and for operating said actuating member to actuate that counter, of a shaft actuated by said operating mechanism, a drum mounted thereon, a bell-crank lever journaled on said shaft, a shield carried by one arm of said lever and extending across the face of said drum, a pin carried by the opposite end of said lever, a spring engaging said lever and tending to hold said shield normally in its elevated position, a shaft extending parallel to said drum, an arm carried by said shaft, a hook carried by said arm, a projection carried by said shaft and adapted to be engaged by a moving part of said operating mechanism when the same is in its normal position, a spring engaging said shaft and tending to rotate the same to move said arm downwardly and bring said hook into engagement with said pin when said moving part of the operating mechanism has moved out of engagement with said projection and adapted to be rotated to raise the same, thereby depressing said shield when said moving part again engages said projection upon its return to normal position, substantially as described.

45. In a machine of the character described, the combination, with a plurality of counters, an actuating member therefor, and operating mechanism for moving said actuating member into operative relation with one of said counters and for operating said actuating member to actuate that counter, of a shaft actuated from said operating mechanism, an indicator-drum mounted on said shaft, an arm journaled on said shaft, a shield carried by said arm and extending across the face of said drum, means for operating said arm to move said shield away from the indication on the drum and to hold the same in such position, means for releasing said holding means when said shaft begins to rotate, and a spring for moving said shield in front of said indication, substantially as described.

46. In a machine of the character described, the combination, with a plurality of counters, an actuating member therefor, and operating mechanism for moving said actuating member into operative relation with one of said counters and for operating said actuating member to actuate that counter, of a shaft actuated from said operating mechanism, an indicator-drum mounted on said shaft, a series of projections carried by said drum, an arm journaled on said shaft, a shield carried by said arm and extending across the face of said drum, a spring tending to hold said shield normally in front of said indication on said drum, a pin carried by said arm, a bell-crank lever carried by a movable part of said machine, one arm of said lever having a hook adapted to engage said pin and move said shield away from said indication and hold the same in such position when the operating mechanism is in its normal position, the other arm having a projection lying in the path of the projections on said drum and adapted to be engaged thereby when said operating mechanism is actuated to move said lever and release said hook from said pin and allow said shield to move in front of the indication on said drum, substantially as described.

47. In a machine of the character described, the combination, with a resetting-shaft, a plurality of counters thereon and operating mechanism for said counters, of a second shaft parallel to said resetting-shaft, an indicator-wheel mounted on said shaft, means actuated from said operating mechanism for rotating said indicator-wheel, and means controlled by the movement of said operating mechanism to prevent the overthrow of said indicator-wheel, substantially as described.

48. In a machine of the character described, the combination, with a resetting-shaft, a plurality of counters thereon, and operating mechanism for said counters, of an indicator-wheel journaled in said machine, a series of projections carried thereby, a shaft extending parallel with said indicator-wheel, a stop carried by said shaft and having its free end in alinement with the projections on said indicator-wheel, a spring engaging said shaft and tending to move said stop into the path of said projections, and an arm on said shaft engaging a movable part of said operating mechanism and normally holding said stop out of the path of said projections, whereby, when said movable part is moved out of engagement with said arm, said stop is moved into the path of the projections on said indicator-wheel, substantially as described.

49. In a machine of the character described, the combination, with a resetting-shaft, a plurality of counters mounted thereon and operating mechanism for said counters, of a shaft parallel to said resetting-shaft, an indicator-wheel mounted on said shaft and operated from said operating mechanism and operatively connected with said resetting-shaft, of means controlled by said resetting-shaft for preventing the overthrow of said indicator-wheel when it is reset to zero, substantially as described.

50. In a machine of the character described, the combination, with a resetting-shaft, a plurality of counters mounted thereon, and operating mechanism for said counters, of an indicator-wheel mounted in said machine and having a series of projections thereon, an arm pivotally supported near said wheel, a plate having a tooth carried by said arm, and means actuated from said resetting-shaft for moving said plate to bring said tooth in the path of the projection on said indicator-wheel, substantially as described.

51. In a machine of the character described, the combination, with a resetting-shaft, a plurality of counters thereon and means for operating said counters, of an indicator-wheel mounted in said frame and having a series of projections thereon, means actuated from said resetting-shaft for resetting said indicator-wheel to zero, a shaft extending parallel to said indicator-wheel, an arm loosely mounted thereon, a tooth carried by said arm, a lever pivotally supported in said machine and extending in the rear of said tooth, a projection carried by said lever and a finger rotating in unison with said resetting-shaft and adapted to engage the projection on said lever to move said lever into engagement with said tooth and move said tooth into the path of the projection on said indicator-wheel, substantially as described.

52. In a machine of the character described, the combination, with a resetting-shaft, a plurality of counters mounted thereon and means for operating said counters, of an indicator-plate pivotally mounted in said machine, a spring tending to move said indicator-plate into one position, and means actuated from said resetting-shaft for moving said plate in the other position against the tension of said spring, substantially as described.

53. In a machine of the character described, the combination, with a resetting-shaft, a plurality of counters mounted thereon, and means for operating said counters, of a shaft, an arm journaled on said shaft and having an indicator-plate at one end thereof, a spring engaging said arm and tending to hold said indicator-plate in one position, a gear having a pin in alinement with said arm, and means actuated from said resetting-shaft for moving said pin into engagement with said arm, thereby moving the indicator-plate into the other position and holding the same against the tension of said spring, substantially as described.

54. In a machine of the character described, the combination, with a resetting-shaft, a plurality of counters mounted thereon, and operating mechanism for said counters, of a shaft, a sleeve journaled in said shaft, an arm carried by said sleeve, an indicator-plate at one end of said arm, a spring engaging said sleeve and tending to hold said indicator-plate in one position, said arm extending beyond said sleeve and having a projection thereon, a gear having a pin in alinement with said arm, and means actuated from the resetting-shaft to move said gear through one-half of a revolution for each complete revolution of the resetting-shaft, thereby bringing the pin into engagement with the arm on every second revolution of said shaft, substantially as described.

55. In a machine of the character described, the combination, with a resetting-shaft, a plurality of counters mounted thereon and operating mechanism for said counters, of a shaft, an arm journaled on said shaft, an indicator-plate carried by said arm, a spring tending to hold said plate normally in one position, a gear having a pin in alinement with said arm and adapted to engage the same to move said plate into its other position against the tension of said spring, a mutilated gear carried by said resetting-shaft and so connected with the first-mentioned gear that a complete revolution of said resetting-gear moves said first-mentioned gear through one-half of a revolution, substantially as described.

In testimony whereof we affix our signatures in presence of two witnesses.

WILFRED I. OHMER.
DAVID B. WHISTLER.
JOHN E. McALLISTER.

Witnesses:
GUSTAV BECKER, Jr.,
CHARLES W. KUHLMAN.